Patented Oct. 24, 1950

2,526,777

UNITED STATES PATENT OFFICE 2,526,777

REMOVAL OF HYDROGEN FLUORIDE AND/OR SILICON TETRAFLUORIDE FROM A HYDROGEN CHLORIDE CONTAINING GAS

Lee B. Smith, Woodbridge, N. J., and John D. Calfee, Manhasset, N. Y., assignors to Allied Chemical & Dye Corporation, New York, N. Y., a corporation of New York No Drawing. Application January 28, 1949, Serial No. 73,447

7 Claims. (Cl. 23—154)

This invention relates to the separation of fluorine compounds from gases containing the same, and is directed particularly to the purification of HCl gases containing HF and/or $SiF_4$ as fluorine impurities.

The fluorine compounds HF or $SiF_4$ or mixtures thereof often exist as impurities in industrial gas streams containing constituents recoverable as products or by-products. In order to render such constituents marketable, it is usually necessary to remove the fluorine impurity or reduce its concentration to a low value. While the principles of this invention are applicable to the separation of fluorine impurity from any suitable gas or gas mixture, the present improvements relate particularly to the separation of these impurities from gases containing HCl. For example, HCl gases which may be formed either as the principal product or as by-product in certain industrial operations, frequently contain various amounts of HF impurities. Further, HF is readily converted to $SiF_4$ by contact with well-known silicon compounds reactive therewith and to which such HCl gases may be exposed. In particular, by chlorinolysis (high temperature exhaustive chlorination resulting in the rupture of the carbon to carbon bond) of 1,1-difluoroethanes, such as ethylidene fluoride, chloro- and chlorofluoro-methanes are obtained as primary sought-for products and in addition considerable quantities of HCl by-product are formed. This HCl may, under some operating conditions be contaminated with small but seriously objectionable amounts of HF. After condensation of some of the higher boiling condensable materials egressing the chlorinolysis reaction, the remaining uncondensed gaseous product, composed essentially of HCl and volatile halogeno-alkanes and halogeno-alkenes, may contain as much as 0.6% by volume or more of HF, depending upon particular conditions. In order to make such HCl marketable for general purposes, adequate reduction in fluorine concentration is usually required. Methods for the removal of HF and $SiF_4$ must be inexpensive because the HCl itself is a relatively low-cost product.

Previously known methods for removing HF from gases containing the same have comprised adsorption with agents which react chemically with the HF, e. g. sodium fluoride. This material is of no value whatsoever in separating HF from HCl since the HCl itself reacts with the sodium fluoride, thereby liberating HF. Other methods employ complicated aqueous absorption and/or distillation procedures. The aqueous liquid phase operation and relatively high temperatures which such methods frequently involve often lead to aggravated corrosion problems and other disadvantageous characteristics. Further, the HCl gas stream may contain, in addition to the HF impurity, organic compounds which may undergo chemical decomposition or condensation reactions at elevated temperatures in the presence of absorbent for the HF or $SiF_4$. Accordingly, these considerations must be kept in mind in the determination of an absorbent or purifying agent. Finally, in previously known procedures, it has been mandatory to keep concentrations of silicon in the system at a minimum to prevent reaction of HF therewith and the consequent escape of fluorine from the absorbent as volatile $SiF_4$. It would be desirable, if possible to avoid requirement of absence of silicon.

In general, an object of this invention is to devise procedures for removing HF and/or $SiF_4$ from gases containing the same. A further object is the provision of economical methods for reducing fluorine content of completely gas phase materials to particularly desired low values at normal temperature and pressure. A more particular object is to provide for fluorine purification of gas phase HCl mixtures by procedures which do not promote polymerization, chlorination, or decomposition of other organic materials which may be present with the HCl. A still further object is to provide procedures in which the presence of silicon does not interfere with the removal of fluorine. Other objects and advantages will appear hereinafter.

We have discovered that $SiF_4$ may be substantially completely removed (i. e., 99 to 99.5% or more of the fluorine content may be removed) from other gases by contacting such gases with a purifying agent comprising boric acid or a salt thereof, preferably boric acid, suspended on an inorganic oxygenated silicon compound reactive with HF. In purifying a gas according to a preferred embodiment of our invention, the stated objects may be realized by passing the gas, comprising the $SiF_4$ impurity, under suitable gas-solid contacting conditions into and thru a body of said purifying agent, whereupon the $SiF_4$ impurity content is selectively removed and held by the agent and thereby separated from the gas stream. Particular embodiments of our invention comprise so treating and purifying HCl gases containing $SiF_4$. In the case in which HCl gases are treated, it might be expected that HCl would displace the fluorine compounds from or prevent their retention by the agent, or otherwise impair the functioning of the purifying agent. We have found that no such reactions interfere with our purification procedure. The enhanced fluorine removal is obtained according to our invention by treatment with inexpensive and readily available substances and with a minimum of risk of chemical decomposition or condensation of organic materials which might be mixed with HCl. Specifically, halogeno-alkenes mixed with chlorinolysis by-product HCl are not noticeably affected by our suspended boric purifying agent. The operation of our process at normal pressure and at relatively low temperatures are further advantageous features, affording simplicity of operation at a minimum cost.

When fluorine impurity in the particular gas undergoing treatment includes a substantial amount of HF, one embodiment of our invention comprises first converting the HF to $SiF_4$ by contacting the mixture with an inorganic oxygenated silicon compound reactive at about room temperature with HF, under suitable contacting conditions, e. g. at about room temperature and for time interval long enough to secure effective contact of gas and solid. Silica gel, glass wool, or other forms of silica which are known to be reactive with HF at about room temperature may be employed for this purpose. The resulting gas stream containing $SiF_4$ but no substantial amount of unreacted HF is subsequently contacted with the suspended boric composition which removes the $SiF_4$ from the mixture. This pretreatment with silicon compound is desirable since in some circumstances it appears that contact of unreacted HF directly with boric compound causes appreciable gasification of the boron, which may be undesirable in some instances.

The purification process of the invention is particularly applicable to the treatment of gases containing the indicated fluorine impurities and substantial amounts of HCl, e. g. 10% and upward by volume, and preferably gases containing a major portion of HCl by volume.

As stated above, by-product HCl gases recovered from chlorinolysis of ethylidene fluoride may, in some circumstances, contain around 0.6% HF by volume. This is typical of HF contaminated HCl gases produced in certain types of industrial processes which gases may contain fluorine compound impurity in amount equivalent to from 0.1% up to 0.6% and more of HF by volume (NTP). On the other hand, gases containing little or no HCl may contain these fluorine impurities in amounts equivalent to 2% or more of HF by volume. In general, this invention is directed to the treatment of gases containing the fluorine compound impurities noted in amounts equivalent to appreciably more than 0.1% by volume of HF. As to all gases purifiable by the procedures of the invention, we normally operate the present improved procedures to form gases having a fluorine compound impurity content equivalent to less than 0.1% and desirably to less than 0.01% by volume of HF. Preferably, and particularly in the treatment of gases containing the indicated fluorine impurities and substantial quantities of HCl, and where stringent specifications require still lower fluorine content, we proceed so as to produce HCl gases of fluorine content equivalent to not more than 0.006% by volume of HF.

The inorganic oxygenated compounds of silicon which are known to react with HF to produce $SiF_4$ are, broadly considered, the carriers upon which we suspend our boric purifying agents. We find that such materials which have a surface roughness or porosity of microscopic or sub-microscopic size, e. g., materials which have an "active" surface, hold in suspension large amounts of boric compound and are, therefore, suitable carriers. Of this class of active silicon compound carriers, silica gel and fuller's earth are preferred. Other types which may be effectively employed for absorption of HF and $SiF_4$ from gases are bentonitic and kaolinitic types of aluminum silicates, silicic acid or its dehydration derivatives and the various types of kieselguhr.

Fuller's earth, which is one of the preferred carriers, is a form of hydrous aluminum silicate mineral well known in the chemical and related arts. Its chemical composition and physical structure may vary depending upon the particular locality in which it is mined, but general characteristics of the material include a structure of agglomerated, slender, needle-like crystals of electron microscopical size and a ratio of silica to alumina substantially higher than the bentonitic and kaolinitic types of aluminum silicates, i. e. as high as 4 to 1 and above. We propose the use of any of these various forms of fuller's earth as boric compound carrier for removal of fluorine according to this preferred embodiment of our invention.

The carrier is preferably employed in the form of granules or pellets of a size suitable to the size of equipment and scale of operation. We also find that most advantageous results are obtained when the agent contains minimum free water, and therefore prefer to dehydrate the agent. In dehydrating, it is desirable to avoid temperatures which cause deterioration of the material. Means for effecting such dehydration are known. Most preferably, however, when purifying gaseous HCl composition, we dehydrate suspended boric purifying agent by passing the gaseous composition therethrough for a time sufficient to effect the desired removal of water. In this procedure, the heat generated upon contact of the HCl with the undehydrated agent causes evaporation and removal of the water.

To suspend the boric acid or salt thereof on the carrier, the boric compound in powder form as usually obtained in commerce is first preferably ground to a finer powder to facilitate adherence thereof to the carrier. It is then added to the carrier and mixed mechanically in order to effect uniform distribution. However, other techniques for suspending the boric compound will be apparent and may suffice for the purposes in view. The amount of boric compound added to the carrier depends largely upon the surface area afforded thereby and upon the effectiveness of purifying agent desired. Ordinarily, the maximum amount of boric which the carrier can efficiently disperse will be added thereto. We find that when our preferred carriers, fuller's earth or silica gel are employed, as much as 180 and 120 parts by weight of boric compound per thousand parts of carrier, respectively, may be effectively utilized.

The temperatures employed are those which effect the desired removal of $SiF_4$ from the carrying gas stream. As heretofore indicated, it is a particular advantage of our procedure that materials may be purified at temperatures which are not high, preferably at normal, i. e. room temperature. When purifying gaseous compositions, condensation of liquid on the purifying agent causes obstruction of the surface, and consequent decrease of efficiency of removal of fluorine compound. Accordingly, in our preferred process, it is important to maintain the agent in a dry condition and unwetted by liquid material. This may be accomplished by preliminarily, if necessary, removing from the gas stream to be treated all constituents condensable at the treatment temperature contemplated, or by maintaining the temperature at which the treating operation is carried out, above that at which the less volatile materials in the gas condense. Hence, in the preferred embodiment, the purification treatment is a gas-phase operation. We find that at temperatures as low as 20–25° C. satisfactory absorption of $SiF_4$ is usually obtained. Temperatures should be maintained below those at which there is insufficient absorption of fluorine compound or at which decomposition of organic material mixed with the HCl gas occurs. At 100° C. noticeable decrease in effectiveness of absorbing agent occurs and accordingly temperatures substantially above 100° C. are ordinarily not employed. We prefer to operate at temperature of about 70° C. or below.

For removal of $SiF_4$ according to our invention, the pressure may be maintained at any value at which the desired degree of absorption of these compounds by the fuller's earth is obtained. Although, as heretofore indicated, it is an advantage of our process that effective removal of fluorine compounds may be realized at ordinary (i. e. atmospheric) pressure, if desired or expedient, the process may be operated at elevated or reduced pressure.

Our preferred purification method is conveniently carried out by continuously introducing gas to be purified containing $SiF_4$ into a zone containing suspended boric compound, contacting the gas with purifying agent under appropriate conditions particularly conditions of time of exposure to the action of the purifying agent, and continuously withdrawing the effluent gas from the zone. Two or more zones in series forming a purification unit may be employed, the last zone in the direction of flow containing the most active agent. When desirable or necessary to replace the agent in any zone, the gas flow is stopped to permit recharging with fresh agent. If, as preferred, two or more purification units are operated in parallel, while one is being recharged with fresh agent, the flow of gas through the others may be continued and uninterrupted operation thereby obtained. When purifying a gas containing HF by pre-treating with silicon compound, one embodiment of our invention comprises continuously introducing the gas to be purified into a zone containing inorganic oxygenated silicon compound reactive at about room temperature with HF and then into a zone containing suspended boric composition, and contacting the gas with the silicon compound and with the purifying agent in the respective zones under conditions and for time sufficient to effect substantially complete conversion of HF to $SiF_4$ by the silicon compound and absorption of $SiF_4$ by the purifying agent, and continuously withdrawing the purified gaseous product from the second zone.

As indicated above, the gas stream to be purified is maintained in contact with the suspended boric composition for a time sufficient to effect removal of $SiF_4$. In a continuous process, the space velocity per hour or rate of passage of the gas stream through the body of treating agent is regulated, in accordance with the particular operating conditions at hand, so as to maintain each increment of gas in contact with the treating agent for a time interval sufficient to effect the degree of impurity removal desired, i. e. to reduce fluorine compound impurity content to the equivalent of less than 0.1%, desirably to less than 0.01%, and in the best embodiments to not more than 0.006% by volume of HF. Space velocity per hour indicates volumes of reactant gas at room temperature per volume of reaction space per hour. The optimum space velocity may depend upon particular operating conditions, e. g. size and shape of reaction zone, amount and type of purifying agent, amount of impurities present in the gas composition, temperature, pressure, etc., and importantly, the degree of purification required in any given operation. While the complex nature of the process mechanism and the permissible variables just indicated make it impractical to specify optimum time of contact for all operating conditions, we find that in order to obtain good purification for most purposes, space velocity per hour should be maintained below about 125. With judicious control of temperature, appreciable loss by reaction of organic material normally present in chlorinolysis by-product HCl compositions is avoided even at prolonged time of contact. Accordingly, the maximum time of contact or minimum space velocity is determined generally by desired capacity of equipment and other economic considerations.

Due to its complexity, the mechanism by which our suspended agents effect purification of HCl compositions is somewhat obscure. Accordingly, we do not wish to limit ourselves to any particular theory. However, it is our belief that the constituents of the agent react chemically with the $SiF_4$ thereby retaining the fluorine and preventing displacement thereof by the HCl and escape with the main stream of purified HCl material.

The following examples illustrate our invention, the parts being by weight:

*Example 1*

To a mixture from the high temperature chlorinolysis of ethylidene fluoride ($CH_3$—$CHF_2$) (after cooling to about minus 20° C. to condense out $C_2Cl_4$ and $CCl_4$), consisting of approximately 35% lower alkyl halides, approximately 65% HCl and 0.6% HF (all by volume) additional HF was added to raise the total HF concentration to about 3% by volume. The purpose of thus increasing the HF content of the feed gas to about 5 times its normal value was to obtain an accelerated test of the effectiveness of the purifying agent in removing fluorine impurity. The fortified gas mixture was passed continuously through a reactor containing silica gel thereby to convert HF to $SiF_4$. The resulting $SiF_4$-containing gas was thence passed continuously through an absorber containing finely pulverized boric acid suspended on fuller's earth prepared by grinding ordinary powdered boric acid to a very fine powder and mechanically mixing 200 parts of such material with 1100 parts of fuller's earth. The gas was passed through the boric acid absorbent at 100 space velocity hour units. The silica gel reactor and the absorber were maintained at about 30° C. and atmospheric pressure. Operation was continued for 27 hours, during which time approximately 135 parts of HF were introduced into the reactor. The fluorine content of the HCl gas effluxing the tower averaged about 0.003% equivalent HF by volume. The HCl gas was passed into an HCl absorber of conventional construction, and 20° Bé. muriatic acid recovered from the treated gas contained less than 0.0006% HF by weight which was equivalent to 99.9% removal of HF from the original fortified gas.

*Example 2*

A gas consisting of approximately 35% nitrogen, approximately 65% HCl and 0.6% HF was passed in a continuous stream through a reactor containing glass wool thereby to convert HF to $SiF_4$, and thence through an absorber packed with 100 parts boric acid suspended on 900 parts of silica gel prepared according to the method described in Example 1. The gas was passed through the absorber maintained at about 30° C. and atmospheric pressure at about 100 space velocity hour units. The fluorine content of the HCl gas effluxing the boric acid absorber averaged about 0.00024% equivalent HF by volume. The effluent gas was passed into an HCl absorber and 20° Bé. muriatic acid recovered therefrom containing less than 0.005% HF by weight, which was equivalent to 99.96% removal of HF from the original feed gas mixture.

*Example 3*

The flow of gas described in Example 2 was discontinued, and a chlorinolysis by-product gas containing about 35% lower alkyl halides, about 65% HCl and 0.6% HF (all by volume) was passed in a stream through the glass wool converter, boric acid absorber and HCl absorber described in Example 2. The conditions of temperature, pressure and rate of flow were maintained substantially the same as in the latter mentioned example. The fluorine content of the HCl gas effluxing the boric acid absorber averaged about 0.0054% equivalent HF by volume. The 20° Bé. muriatic acid recovered from the HCl absorber contained about 0.0016% by weight HF. From these data 99.1% removal of HF from the original feed gas mixture was computed.

In copending application Serial No. 55,423, filed October 19, 1948, applicants disclose and claim a method involving treating gases, containing fluorine compounds as impurities, with fuller's earth.

We claim:

1. The process for reducing the fluorine content of an HCl gas stream containing $SiF_4$, which comprises passing said gas stream, while wholly in the gas phase and at temperature not more than 100° C., through a body of boric acid suspended on fuller's earth, and regulating the rate of passage of said gas stream through said body so as to reduce the fluorine content of said stream to equivalent to less than 0.01% by volume of HF.

2. The process for reducing the fluorine content of a gas stream containing by volume a major portion of HCl, and $SiF_4$ as fluorine compound impurity, which process comprises passing said gas stream, while wholly in the gas phase and at temperature not more than 70° C., through a body of boric acid suspended on fuller's earth, and regulating the rate of passage of said gas stream through said body so as to reduce the fluorine content of said stream to equivalent to not more than 0.006% by volume of HF.

3. The process for reducing the fluorine content of an HCl gas containing $SiF_4$ as fluorine impurity, which comprises contacting said gas with material of the group consisting of boric acid and its salts suspended on an inorganic oxygenated silicon compound reactive with HF, and regulating the time of contact of said gas with said material so as to reduce the fluorine content of said gas to equivalent to less than 0.1% by volume of HF.

4. The process for reducing the fluorine content of an HCl gas stream containing $SiF_4$, which comprises passing said gas stream while wholly in the gas phase and at temperature not more than 100° C., through a body of boric acid suspended on material of the group consisting of fuller's earth and silica gel, and regulating the rate of passage of said gas stream through said body so as to reduce the fluorine content of said stream to equivalent to less than 0.01% by volume of HF.

5. The process for reducing the fluorine content of an HCl gas stream containing $SiF_4$, which comprises passing said gas stream while wholly in the gas phase and at temperature not more than 100° C., through a body of boric acid suspended on silica gel, and regulating the rate of passage of said gas stream through said body so as to reduce the fluorine content of said stream to equivalent to less than 0.01% by volume of HF.

6. The process of reducing the fluorine content of an HCl gas containing HF as an impurity which process comprises contacting said gas with an inorganic oxygenated silicon compound reactive at about room temperature with HF under conditions to convert said HF to $SiF_4$ to form a resulting gas comprising $SiF_4$, and contacting said resulting gas with boric acid suspended on fuller's earth at a temperature and for a period of time sufficient to reduce the fluorine content of said resulting gas to equivalent to less than 0.1% by volume of HF.

7. The process of reducing the fluorine content of an HCl gas containing HF as an impurity which process comprises contacting said gas with an inorganic oxygenated silicon compound reactive at about room temperature with HF under conditions to convert said HF to $SiF_4$ to form a resulting gas comprising $SiF_4$, and contacting said resulting gas with boric acid suspended on silica gel at a temperature and for a period of time sufficient to reduce the fluorine content of said resulting gas to equivalent to less than 0.1% by volume of HF.

LEE B. SMITH.
JOHN D. CALFEE.

REFERENCES CITED

The following references are of record in the file of this patent:

UNITED STATES PATENTS

| Number | Name | Date |
|---|---|---|
| 1,936,078 | Adamson | Nov. 21, 1933 |
| 2,343,462 | Laird et al. | Mar. 7, 1944 |
| 2,440,542 | Hughes | Apr. 27, 1948 |
| 2,454,615 | Ridgway et al. | Nov. 23, 1948 |